(12) United States Patent
Seko et al.

(10) Patent No.: US 8,524,315 B2
(45) Date of Patent: Sep. 3, 2013

(54) METHOD FOR MANUFACTURING TUBULAR BODY

(75) Inventors: Masayuki Seko, Kanagawa (JP); Toshikazu Ohno, Kanagawa (JP); Yuichi Yashiki, Kanagawa (JP); Masaru Suzuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 236 days.

(21) Appl. No.: 13/091,944

(22) Filed: Apr. 21, 2011

(65) Prior Publication Data

US 2012/0070586 A1 Mar. 22, 2012

(30) Foreign Application Priority Data

Sep. 17, 2010 (JP) ................................ 2010-209416

(51) Int. Cl.
*B05D 3/02* (2006.01)

(52) U.S. Cl.
USPC ..... 427/154; 427/242; 427/372.2; 427/374.1; 427/374.2; 427/384; 427/385.5

(58) Field of Classification Search
None
See application file for complete search history.

(56) References Cited

U.S. PATENT DOCUMENTS

| | | | |
|---|---|---|---|
| 4,898,754 A * | 2/1990 | Christensen et al. | ......... 427/369 |
| 6,090,326 A | 7/2000 | Hirohata et al. | |
| 6,139,784 A | 10/2000 | Oshima et al. | |
| 2004/0247907 A1 | 12/2004 | Goda et al. | |
| 2006/0025257 A1 | 2/2006 | Tanabe et al. | |
| 2008/0138120 A1 * | 6/2008 | Miyamoto | ..................... 399/302 |
| 2009/0246392 A1 * | 10/2009 | Miyamoto | ................. 427/385.5 |

FOREIGN PATENT DOCUMENTS

| | | |
|---|---|---|
| JP | A-3-180309 | 8/1991 |
| JP | A-5-077252 | 3/1993 |
| JP | A-9-085756 | 3/1997 |
| JP | A-10-063115 | 3/1998 |
| JP | A-2000-065875 | 3/2000 |
| JP | A-2002-086465 | 3/2002 |
| JP | A-2002-341673 | 11/2002 |
| JP | A-2003-136632 | 5/2003 |
| JP | A-2004-284166 | 10/2004 |
| JP | A-2004-287383 | 10/2004 |
| JP | A-2006-078678 | 3/2006 |
| JP | A-2006-103140 | 4/2006 |
| JP | A-2006-167516 | 6/2006 |
| JP | A-2007-086492 | 4/2007 |
| JP | A-2010-032435 | 2/2010 |

OTHER PUBLICATIONS

Office Action issued in Japanese Application No. 2010-209416 dated Oct. 12, 2010.

* cited by examiner

*Primary Examiner* — Erma Cameron
(74) *Attorney, Agent, or Firm* — Oliff & Berridge, PLC

(57) ABSTRACT

According to an exemplary embodiment, a method for manufacturing a tubular body is provided. The method includes maintaining at about 15° C. or lower a heat-curable solution containing a polyimide precursor solution in which a conductive agent having an acidic group is dispersed; coating the heat-curable solution maintained at about 15° C. or lower on a core body to form a coating film of the heat-curable solution, and curing the coating film by heating to obtain a tubular body.

3 Claims, 6 Drawing Sheets

METHOD FOR MANUFACTURING TUBULAR BODY

CROSS-REFERENCE TO RELATED APPLICATIONS

This application is based on and claims priority under 35 USC 119 from Japanese Patent Application No. 2010-209416, filed on Sep. 17, 2010.

BACKGROUND

1. Technical Field

The invention relates to a method for manufacturing a tubular body.

2. Related Art

A tubular body used for an electro-photographic image forming device, etc. may be required to have strength or dimensional stability. For application to various devices using an electro-photographic system, it is known that a tubular body is constituted by including a conductive agent therein.

SUMMARY

According to an aspect of the invention, a method for manufacturing a tubular body is provided. The method includes maintaining at 15° C. or lower (or about 15° C. or lower) a heat-curable solution containing a polyimide precursor solution in which a conductive agent having an acidic group is dispersed; coating the heat-curable solution maintained at 15° C. or lower (or about 15° C. or lower) on a core body to form a coating film of the heat-curable solution, and curing the coating film by heating to obtain a tubular body.

BRIEF DESCRIPTION OF THE DRAWINGS

Exemplary embodiments of the present invention are described in detail based on the following figures, wherein:

FIG. 4A and FIG. 4B are a schematic diagram illustrating an example of a device for measuring volume resistivity to measure the volume resistivity of a tubular body, wherein FIG. 4A is a A-A' cross sectional view of FIG. 4B;

FIG. 5A and FIG. 5B are a schematic diagram illustrating an example of a device for measuring volume resistivity to measure the volume resistivity of a tubular body, wherein FIG. 5A is a A-A' cross sectional view of FIG. 5B; and FIG. 6A and FIG. 6B are a schematic diagram illustrating an example of a device for measuring volume resistivity to measure the volume resistivity of a tubular body, wherein FIG. 6A is a A-A' cross sectional view of FIG. 6B.

DETAILED DESCRIPTION

Figure 1:
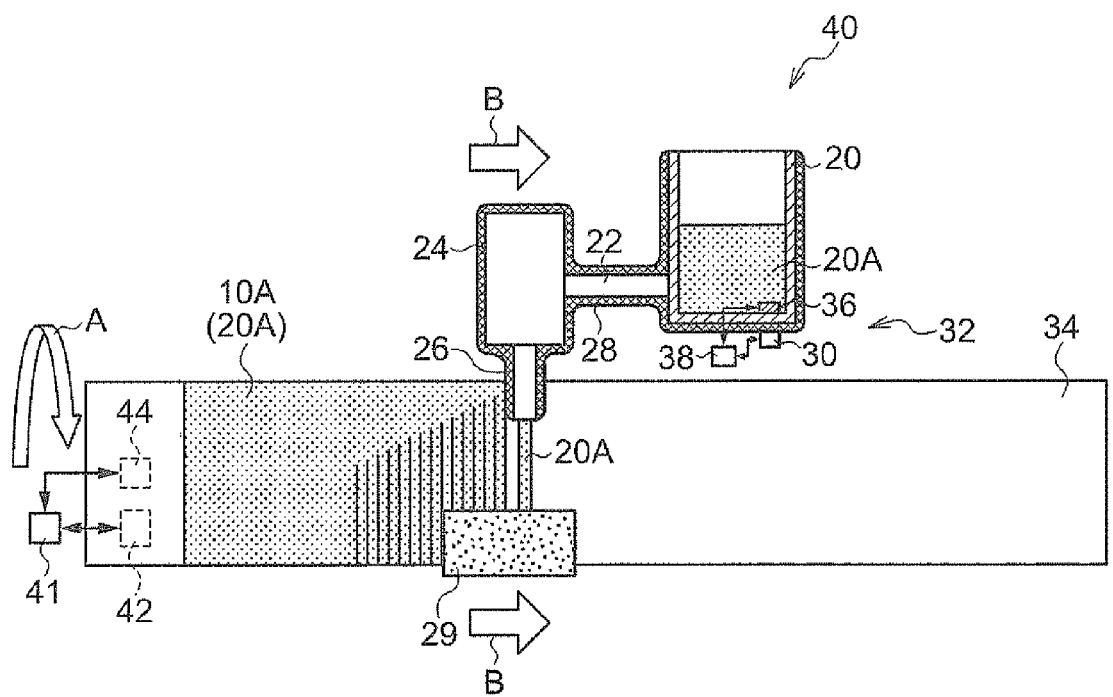
FIG. 1 is a schematic diagram illustrating one example of a film forming device that is used for the manufacture of the tubular body of the exemplary embodiment.

Herein below, an exemplary embodiment of the method for manufacturing a tubular body of the exemplary embodiment is explained.

The method for manufacturing a tubular body according to the exemplary embodiment includes (1) maintaining at 15° C. or lower (or about 15° C. or lower) a heat-curable solution containing a polyimide precursor solution in which a conductive agent having an acidic group is dispersed (maintaining process), (2) coating the heat-curable solution maintained at 15° C. or lower (or about 15° C. or lower) by the maintaining process on a core body to form a coating film of the heat-curable solution (coating film forming process), and (3) curing the coating film by heating to provide a tubular body (heat-curing process).

Regarding the method for manufacturing a tubular body according to the exemplary embodiment, by undergoing the maintaining process, coating film forming process, and heat-curing process, the heat-curable solution maintained at 15° C. or lower is coated on a core body, and the polyimide resin precursor contained in the coating film that has been formed by coating on the core body is imidated by heating. As a result, a tubular body made of polyimide resin is produced.

The tubular body obtained by the manufacturing method according to the exemplary embodiment may be applied to a photo-sensitive device, an intermediate transfer device, a transfer and dividing device, a conveying device, a charging device, and a developing device, etc. in an electrophotographic copying machine and a laser printer, etc.

Herein, the volume resistivity of the tubular body produced preferably has no non-uniformness caused by the production. However, when the maintaining process and coating film forming process of the exemplary embodiment are not included, volume resistivity of a tubular body produced may have variation even when the content of the conductive agent having an acidic group that is included in the heat-curable solution and the content of the polyimide precursor solution included in the heat-curable solution are the same.

As a result of intensive studies, the inventors of the invention found that variation of the volume resistivity of the tubular body is caused by the following phenomenon.

Specifically, although in the heat-curable solution, there is equilibrium between the dissociation reaction and binding reaction of polyimide resin precursor molecules, at the room temperature (20° C.) or higher, the dissociation reaction is more likely to occur in general than the binding reaction. In addition, with the progress of the dissociation reaction, it is considered that the dispersion state of the conductive agent having an acidic group in the heat-curable solution is changed due to an interaction between a basic group in the polyimide resin precursor and an acidic group in the conductive agent having an acidic group. As such, it is considered that progress level of the interaction becomes different depending on the maintaining time of the heat-curable solution, and thus non-uniformness of the volume resistivity of the tubular body produced is caused.

Accordingly, as described above, the method for manufacturing a tubular body according to the exemplary embodiment includes a maintaining process to maintain at 15° C. or lower a heat-curable solution containing polyimide precursor solution in which a conductive agent having an acidic group is dispersed, and a coating film forming process to coat the heat-curable solution maintained at 15° C. or lower by the maintaining process on an outer surface of a core body to form a coating film of the heat-curable solution. In this regard, it is thought that, when the heat-curable solution containing polyimide precursor solution in which a conductive agent having an acidic group is dispersed is maintained at 15° C. or lower, molecular reaction of the polyimide resin precursor is suppressed and relative variation in the interaction between the basic group of the polyimide resin precursor and the acidic group of the conductive agent is suppressed.

Thus, it is thought that according to the method for manufacturing a tubular body of the exemplary embodiment, the variation of the volume resistivity of the tubular body depending on the difference in a maintaining time of the heat-curable solution in the process of manufacturing the tubular body may be suppressed.

In the method for manufacturing a tubular body according to the exemplary embodiment, the heat-curable solution is maintained at 15° C. or lower (or about 15° C. or lower) in the maintaining process and the heat-curable solution maintained at 15° C. or lower (or about 15° C. or lower) is coated on an outer surface of a core body in the coating film forming process. The temperature for the maintaining process is more preferably 8° C. (or about 8° C. or lower) or lower, and particularly preferably 5° C. or lower (or about 5° C. or lower).

In the method for manufacturing a tubular body according to the exemplary embodiment, the heat-curable solution containing a polyimide precursor solution in which a conductive agent having an acidic group is dispersed is maintained at 15° C. or lower (or about 15° C. or lower), and it is not necessary to maintain 15° C. or lower in the process in which the conductive agent having an acidic group is dispersed in a polyimide precursor solution, that is a process before the maintaining process (detailed explanation is given below) and the dispersion may be carried out in a state that the temperature is raised to the one required for dispersion. Example of the temperature for dispersion is explained later.

The period from the moment of starting to maintain the heat-curable solution by the maintaining process of the method for manufacturing a tubular body according to the exemplary embodiment to the moment of obtaining a coating film by the subsequent coating film forming process is preferably as short as possible. It is preferable that the closer the maintaining temperature of the heat-curable solution in the maintaining process and the maintaining temperature of the heat-curable solution in the coating film forming process are to 15° C. (i.e., the higher the temperature is (the closer the temperature is to 15° C.)), the shorter the period is.

Specifically, when the maintaining temperature of the heat-curable solution in the maintaining process is 15° C., the period may be 10 days (24 hours×80) or less, when the maintaining temperature of the heat-curable solution in the maintaining process is 10° C., the period may be 40 days (24 hours×40) or less, and when the maintaining temperature of the heat-curable solution in the maintaining process is 0° C., the period may be 80 days (24 hours×80) or less.

In the method for manufacturing a tubular body according to the exemplary embodiment, the heat-curable solution is maintained at 15° C. or lower in the maintaining process. It is preferable to maintain the heat-curable solution at 15° C. or lower even in the coating film forming process described above. Specifically, it is preferable to maintain, until the time point of switching from the coating film forming process to the heat-curing process (i.e., until right before heating the coating film by starting the heating process), the coating film made of the heat-curable solution, that is coated on a core body, at 15° C. or lower.

As discussed above, it is thought that, by maintaining the coating film made of the heat-curable solution at 15° C. or lower also in the coating film forming process, non-uniformness of the volume resistivity of the tubular body is further suppressed.

According to this case, the maintaining temperature for the heat-curable solution in the maintaining process and the maintaining temperature for the heat-curable solution in the coating film forming process may be 15° C. or lower, and they may be the same temperature or different from each other.

The volume resistivity of the tubular body of the exemplary embodiment may be a volume resistivity which allows the tubular body to exhibit a conductive (volume resistivity of less than $10^7$ Ω·cm) or semi-conductive character (volume resistivity of from $10^7$ Ω·cm to $10^{15}$ Ω·cm). The volume resistivity of the tubular body of the exemplary embodiment is preferably $1\times10^{11}$ Ω·cm or higher (or about $1\times10^{11}$ Ω·cm or higher), and more preferably $1\times10^{13}$ Ω·cm or higher (or about $1\times10^{13}$ Ω·cm or higher).

The volume resistivity of the tubular body is adjusted by the content of the conductive agent having an acidic group that is included in the tubular body. In this regard, it is thought that the dissociation of the polyimide resin precursor molecule may especially occur more easily when the content of the conductive agent satisfies high volume resistivity of the tubular body, such as a volume resistivity of at least $1\times10^{11}$ Ω·cm. However, according to the method of manufacturing the tubular body according to the exemplary embodiment, even for a case in which a tubular body in which a content of the conductive agent is such that a high volume resistivity ($1\times10^{11}$ Ω·cm or higher) is satisfied is to be produced, it is thought that the variation in the volume resistivity of the tubular body depending on the difference in a maintaining time of the heat-curable solution in the process of manufacturing the tubular body may be suppressed.

The volume resistivity of the tubular body is measured according to JIS K6911, the disclosure of which is incorporated by reference herein. The volume resistivity is a value that is obtained by dividing the electric potential gradient in a direction parallel to the electric current that flows the inside of the tubular body by the current density. This value is equal to the volume resistance between two electrodes that are two opposing surfaces of two 1-centimeter cubes. Detailed explanation of the measurement method is given below.

Herein below, the method of manufacturing the tubular body of the exemplary embodiment and the materials being used for the production are explained in greater detail.

Dispersion Process

First, a polyimide precursor solution in which a conductive agent having an acidic group is dispersed is prepared for the use in the maintaining process. This polyimide precursor solution in which a conductive agent having an acidic group is dispersed is obtained by a dispersion process that is performed before the maintaining process. In the dispersion process, the conductive agent having an acidic group is dispersed in a polyimide precursor solution. Examples of a method of dispersing the conductive agent having an acidic group include a ball mill, a sand mill, a bead mill, and a jet mill (counter collision type disperser).

In any of these dispersion methods, from the view point of improving dispersability, the viscosity of the solution for the dispersion process (i.e., a solution containing the conductive agent having an acidic group and the polyimide precursor solution) is preferably less than 10 Pa·s. Examples of the method for maintaining such viscosity include a method of diluting with a solvent or a method of adjusting a temperature of the solution at the time of dispersion. Since the evaporation speed of the solvent needs to be considered for the method of diluting with a solvent, the method of adjusting a temperature of the solution at the time of dispersion is preferably used.

Specifically, the temperature of the solution may be adjusted so that the viscosity of the solution in the dispersion process (i.e., a solution containing the conductive agent having an acidic group and the polyimide precursor solution) is less than 10 Pa·s. For example, it is preferable to adjust the temperature of the solution so that the temperature of the solution containing the conductive agent having an acidic group and the polyimide precursor solution is 50° C. or higher in the dispersion process. For heating the solution in the dispersion process, the heat generated from mechanical energy at the time of dispersion may be used or a container that is used for the dispersion may be heated at the time of dispersion.

Maintaining Process

In the maintaining process, the heat-curable solution containing the polyimide precursor solution in which the conductive agent having an acidic group is dispersed and which is obtained by the dispersion process above, is maintained at 15° C. or lower (or about 15° C. or lower).

The polyimide precursor solution is obtained by reacting tetracarboxylic acid dianhydride with a diamine component in the solvent described above. Type of the polyimide is not specifically limited; however an aromatic polyimide that is obtained by reacting an aromatic tetracarboxylic acid dianhydride with an aromatic diamine component is preferable from the viewpoint of layer strength.

Representative examples of the aromatic tetracarboxylic acid include pyromellitic acid dianhydride, 3,3',4,4'-biphenyl tetracarboxylic acid dianhydride, 3,3',4,4'-benzophenone tetracarboxylic acid dianhydride, tetracarboxylic acid dianhydride, 2,3,6,7-naphthalene tetracarboxylic acid dianhydride, 1,2,5,6-naphthalene tetracarboxylic acid dianhydride, 2,2-bis (3,4-dicarboxyphenyl)ether dianhydride, tetracarboxylic acid ester thereof, and a mixture of each of the above tetracarboxylic acids.

Examples of the aromatic diamine component include paraphenylene diamine, metaphenylene diamine, 4,4'-diaminodiphenyl ether, 4,4'-diaminophenylmethane, benzidine, 3,3'-dimethoxybenzidine, 4,4'-diaminodiphenyl propane, and 2,2-bis[4-(4-aminophenoxy)phenyl] propane, etc.

In order to improve adhesiveness to a metal layer, PI-silica hybrid body wherein an alkoxy silane compound is linked to polyimide (PI) may be used as described in Japanese Patent Application Laid-Open (JP-A) No. 2003-136632.

The concentration of the polyimide resin precursor in the polyimide precursor solution and the viscosity of the polyimide precursor solution are suitably adjusted. For example, the solid content concentration of the polyimide precursor solution may be from 10% by weight to 40% by weight. The viscosity of the polyimide precursor solution may be from 1 Pa·s to 100 Pa·s.

Examples of the conductive agent having an acidic group include a carbon based material such as carbon black, carbon fiber, carbon nanotube, and graphite, having an acidic group. Among these, carbon black is preferably used.

Examples of the acidic group contained in the conductive agent include a carboxyl group, a quinone group, a lactone group, and a hydroxy group. It is thought that since the conductive agent included in the heat-curable solution has an acidic group, the dispersability of the conductive agent in the polyimide precursor solution may be improved, and the dispersion stability may also be attained.

The conductive agent having an acidic group is obtained, for example, by oxidizing the conductive agent described above. Examples of the method of oxidizing the conductive agent include an air oxidation method in which reaction is performed by contacting with air under high temperature environment, a method of reacting with nitrogen oxide or ozone at room temperature, a method of oxidizing with an air under high temperature environment followed by ozone oxidation at low temperature, and a contact method.

Examples of the contact method include a channel method, and a gas black method. The conductive agent having an acidic group may be also produced by a furnace black method which uses gas or oil as a raw material. In addition, if necessary, liquid oxidation treatment using nitric acid, etc. may be carried out after performing the treatment described above.

The pH value of the conductive agent having an acidic group according to the exemplary embodiment may be any value. It is preferably pH 5.0 or lower. More preferably, it is pH 4.5 or lower, and still more preferably pH 4.0 or lower.

The pH of the conductive agent having an acidic group that is included in the heat-curable solution is obtained by preparing an aqueous suspension and measuring the pH with a glass electrode. In addition, pH of the conductive agent having an acidic group is adjusted by conditions such as treatment temperature and treatment time in the oxidation process.

Specific examples of the conductive agent having an acidic group according to the exemplary embodiment include "PRINTEX 150T" (pH 4.5, volatile component 10.0%) manufactured by Degussa, "SPECIAL BLACK 350" (pH 3.5, volatile component 2.2%) manufactured by Degussa, "SPECIAL BLACK 100" (pH 3.3, volatile component 2.2%) manufactured by Degussa, "SPECIAL BLACK 250" (pH 3.1, volatile component 2.0%) manufactured by Degussa, "SPECIAL BLACK 5" (pH 3.0, volatile component 15.0%) manufactured by Degussa, "SPECIAL BLACK 4" (pH 3.0, volatile component 14.0%) manufactured by Degussa, "SPECIAL BLACK 4A" (pH 3.0, volatile component 14.0%) manufactured by Degussa, "SPECIAL BLACK 550" (pH 2.8, volatile component 2.5%) manufactured by Degussa, "SPECIAL BLACK 6" (pH 2.5, volatile component 18.0%) manufactured by Degussa, "COLOR BLACK FW200" (pH 2.5, volatile component 20.0%) manufactured by Degussa, "COLOR BLACK FW2" (pH 2.5, volatile component 16.5%) manufactured by Degussa, "COLOR BLACK FW2V" (pH 2.5, volatile component 16.5% manufactured by Degussa), "MONARCH1000" (pH 2.5, volatile component 9.5%) manufactured by CABOT, "MONARCH1300" (pH 2.5, volatile component 9.5%) manufactured by CABOT, "MONARCH1400" (pH 2.5, volatile component 9.0%) manufactured by CABOT, "MOGUL-L" (pH 2.5, volatile component 5.0%) manufactured by CABOT, and "REGAL400R" (pH 4.0, volatile component 3.5%) manufactured by CABOT.

In the exemplary embodiment, the polyimide precursor solution may or may not include a dehydrating agent which transforms a polyamid acid to polyimide.

By using a jet mil for dispersing the conductive agent having an acidic group in the polyimide precursor solution and maintaining at 15° C. or lower a heat-curable solution containing the polyimide precursor solution in which the conductive agent is dispersed, it is possible to obtain a tubular body having highly stable dispersibility of the conductive agent and thus having suppressed variation of a volume resistivity compared with the case in which a different dispersing apparatus is used or the heat-curable solution has not been maintained at 15° C. or lower. The reason for this is thought as follows. Due to a high dispersion performance of a jet mil, the conductive agent exhibit high dispersibility, and by employing the maintaining process, the dispersibility may be maintained.

Coating Film Forming Process

In the coating film forming process, the heat-curable solution that is maintained at 15° C. or lower (or about 15° C. or lower) by the maintaining process is coated on an outer surface of a core body while the solution is maintained in a state of 15° C. or lower (or about 15° C. or lower), to form a coating film made of the heat-curable solution is formed.

Examples of the core body material include a metal such as aluminum and stainless steel, a fluorine resin or silicone resin, and a metal of which surface is coated with such resin. When a metal is used as a core body, preliminarily, chrome or nickel plating may be carried out or a release agent may be coated on the surface of a core body, so that a tubular body (that is obtained by curing the above-described coating film) formed on the core body is easily separated from the core body.

Shape of the core body may be, for example, a hollow-cylinder or a cylinder. However, the shape of the core body is not limited to such shapes, and may be, for example, a flat plane.

A method of forming a coating film on a core body by using the heat-curable solution is not specifically limited, as long as it is a method which allows the coating in a state that the temperature condition for the heat-curable solution is maintained. Examples include an outer surface coating method described in JP-A No. 6-23770, etc., a dip coating method described in JP-A No. 3-180309, etc., a spiral coating method described in JP-A No. 9-85756 and the like, as well as a spin coating method. The method may be selected depending on the shape or size of a core body.

Herein below, the method of performing the maintaining process and coating film forming process under temperature condition of 15° C. or lower is explained as an example of using a spiral coating.

Figure 2:
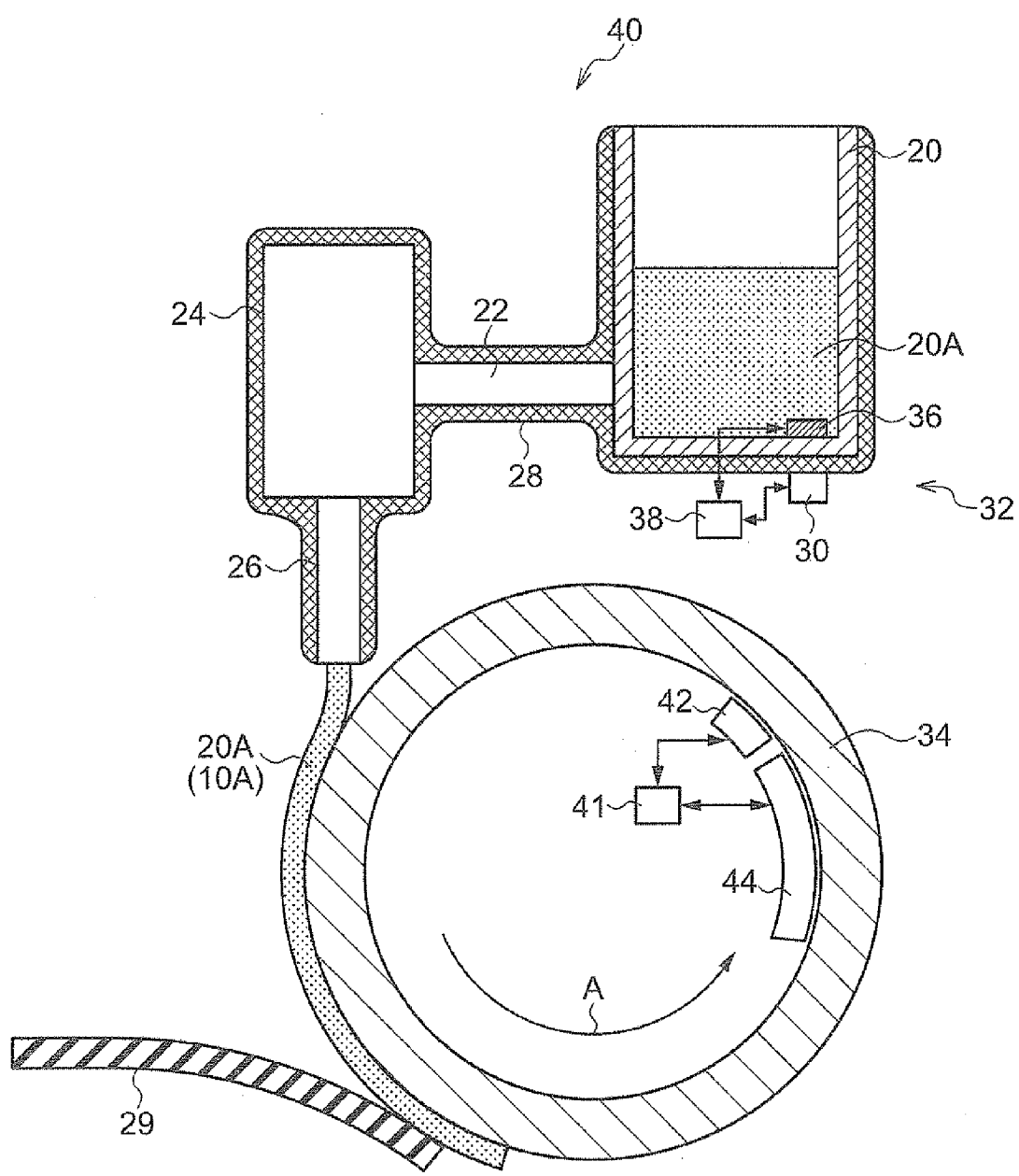
FIG. 2 is a schematic diagram illustrating one example of a film forming device that is used for the manufacture of the tubular body of the exemplary embodiment.

As shown in FIG. 1 and FIG. 2, in the film forming device 40, the heat-curable solution 20A is coated on the outer surface of the core body 34, while the core body 34 is rotated in the direction of arrow A in FIG. 1, and the coating is smoothened by the blade 29 that is placed in contact with the outer surface of the core body 34.

The heat-curable solution 20A which is to be coated on the outer surface of the core body 34 is maintained at 15° C. or lower by the temperature control device 32, and is maintained at 15° C. or lower until it is supplied to the core body 34.

In detail, in the film forming device 40, the heat-curable solution 20A stored in the reservoir 20 is supplied through the supply tube 22 and the nozzle 26 by the pump 24, to the outer surface of the core body 34 which rotates in the direction of arrow A.

In the film forming device 40, the temperature control device 32 which maintains the heat-curable solution 20A stored in the reservoir 20 or the heat-curable solution 20A flowing through the inside of the supply tube 22, the pump 24 and the nozzle 26, at the temperature of 15° C. or lower is installed. The temperature control device 32 may have any structure capable of maintaining of the heat-curable solution 20A stored in the reservoir 20 and the heat-curable solution 20A flowing through the inside of the supply tube 22, the pump 24, and the nozzle 26, at the temperature of 15° C. or lower.

For example, the temperature control device 32 may, for example, include a temperature maintaining member 28, a cooling device 30, a temperature measuring device 36, and a control part 38.

The temperature maintaining member 28 is a member having a temperature maintaining function, and it is provided so as to cover the outer surface of the reservoir 20, the supply tube 22, the pump 24, and the nozzle 26. A well known member having a temperature maintaining function may be used as the temperature maintaining member 28. The cooling device 30 is a device to cool the temperature inside the temperature maintaining member 28 (i.e., inside of the reservoir 20, the supply tube 22, the pump 24, and the nozzle 26) to less than 15° C. As for the cooling device 30, a well known device having a cooling function may be used. By cooling the inside of the temperature maintaining member 28 by the cooling device 30, the heat-curable solution 20A within the reservoir 20, the supply tube 22, the pump 24, and the nozzle 26, that are present inside of the temperature maintaining member 28, is maintained at the cooled temperature.

The temperature measuring device 36 is installed inside the reservoir 20 (for example, inner bottom part of the reservoir 20), and it measures the temperature of the heat-curable solution 20A stored in the reservoir 20.

The control part 38 is electrically connected to the temperature measuring device 36 and the cooling device 30. Based on the temperature information received from the temperature measuring device 36, the control part 38 controls the cooling device 30 so that the temperature inside the temperature maintaining member 28 is maintained at 15° C. or lower.

Thus, in the film forming device 40, the heat-curable solution 20A stored in the reservoir 20 is maintained at 15° C. or lower by the temperature control device 32 installed in the film forming device 40 (maintaining process). By providing the temperature maintaining member 28 to cover the supply tube 22, the pump 24, and the nozzle 26 together with the reservoir 20, the heat-curable solution 20A is maintained at the temperature of 15° C. or lower by the temperature control device 32 during the solution passes through the supply tube 22, the pump 24 and the nozzle 26 and until the solution is coated on the core body 34 to give the coating film 10A (i.e., coating film forming process).

The heat-curable solution 20A coated on the outer surface of the core body 34 is supplied in a streak to the core body 34, and is smoothened out by the blade 29. As a result, on the core body 34, the coating film 10A is formed without having residual spiral-shaped streak of the heat-curable solution 20A. The rotation speed of the core body 34 during the coating is, for example, from 20 rpm to 300 rpm. The relative movement speed of the nozzle 26 to the core body 34 is, for example, from 0.1 in/minute to 2.0 m/minute.

The film forming device 40 and the core body 34 move relatively from one end to the other in a longitudinal direction of the core body 34 (see, the direction of arrow B in FIG. 1). As a result, the coating film 10A of the heat-curable solution 20A is formed on the core body 34 (see, FIG. 3).

In order to suppress the temperature increase to 15° C. or higher of the coating film 10A formed on the core body 34 during the period before heating in the subsequent heat-curing process, a cooling device to cool the coating film 10A may be separately provided to maintain the coating film 10A at 15° C. or lower.

In such case, as shown in FIG. 1 and FIG. 2, the film forming device 40 may, for example, further include the temperature measuring device 42 which measures the temperature of the core body 34, the cooling device 44 which cools the core body 34, and the control part 41 which is electrically connected to the temperature measuring device 42 and the cooling device 44, inside the core body 34. The control part 41 may control the cooling device 44 so as to maintain the temperature of the core body 34 at 15° C. or lower based on the temperature information received from the temperature measuring device 42. In addition, in the heat-curing process described below, the control part 41 may control the cooling device 44 so as to stop the cooling.

In such a constitution, the coating film 10A made of the heat-curable solution 20A, that is formed on the core body 34, may be maintained at 15° C. or lower until heating starts at the heat-curing process described below.

Drying Process

Next, the coating film 10A that is formed on the core body 34 by the coating film forming process is cured by heating (heat-curing process). It is preferable to dry or semi-cure the coating film 10A before the heat-curing process (drying process).

Herein, the term "drying" means the vaporization of the solvent contained in the heat-curable solution which is used in the coating film 10A. In practice, appropriate time is determined with heating it at the temperature of from 30° C. to 250° C. or so (for example, from 15 minutes to 60 minutes). In addition, the term "semi-curing" indicates a state that part of the polyimide resin precursor contained in the heat-curable solution is already imidated to the degree that the imidation is not fully developed. In practice, if an appropriate time is set at around 200° C. (preferably, from 120° C. to 250° C.), the coating film 10A is transformed into a semi-cured state and has slightly higher strength compared to a dry state.

The drying or semi-curing are performed by having appropriate temperature and time, etc. depending on the type of the polyimide resin precursor and solvent. If the solvent is completely vaporized from the coating film 10A, cracks may be easily formed in the coating film 10A. As such, it is preferable to have a certain amount of the solvent remained in the coating film (for example, from 5% by weight to 40% by weight of the initial amount).

The higher the heating temperature, the shorter the heating time may be for the drying process. Further, it is also preferable to apply hot air during the heating. Still further, during the heating, the heating temperature may be increased in stepwise manner, or may be increased at a constant speed.

In the drying process, in order to suppress the sagging of the coating film 10A, it is preferable to carry out the drying process while rotating the core body 34 at the rotation speed of from 5 rpm to 60 rpm with its axial direction aligned with the horizontal direction. In the subsequent heat-curing process, the heat-curing may be performed in a state that the axial direction of the core body 34 is aligned with the perpendicular direction.

Heat-Curing Process

Figure 3:
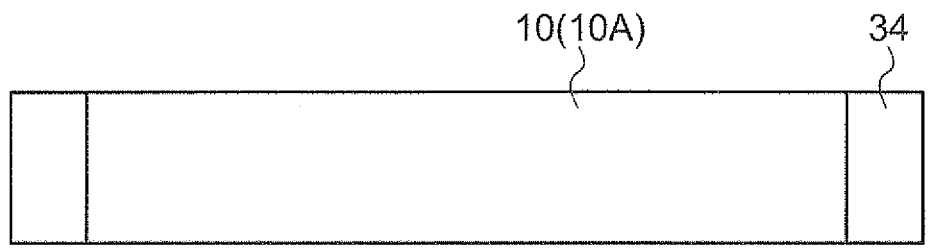
FIG. 3 is a schematic diagram illustrating a state in which a coating film or a tubular body is formed on a core body, in the process of manufacturing the tubular body of the exemplary embodiment.

In the heat-curing process, the coating film 10A which has been formed on the core body 34 by the film coating forming process and has been undergone the drying process is heated so that the polyimide resin precursor included in the coating film 10A is imidated and heat-cured to form the tubular body 10 (see, FIG. 3).

Imidation is performed by heating at the temperature of from 250° C. to 450° C. (preferably from 300° C. to 400° C.), and accordingly, the polyimide precursor is completely cured to become a polyimide resin. The heating time may be, for example, from 20 minutes to 180 minutes.

When the core body material which is included in the molten metal layer is easily oxidized or degraded, as in copper or nickel, for the heating for imidation it is preferable that the heating is carried out in the presence of an inert gas such as nitrogen or argon.

When the heating is carried out in a heating furnace, it is required to maintain the whole internal chamber of the heating furnace at high temperature, and therefore the thermal efficiency is low. On the contrary, according to a method of heating by using an electromagnetically induced heating device, the heating occurs in a metal base, and therefore the thermal efficiency is high. At that time, the heating amount may be controlled to obtain a pre-determined temperature by sensing the surface temperature using a sensor, etc. In the electromagnetically induced heating system, the heating vessel for placing the core body 34 may be small, and therefore there is an advantage that the only a small addition amount of the inert gas may be used when the inert gas is added.

The higher the heating temperature, the shorter the heating time may be for the heat-curing process. Further, it is also preferable to apply hot air during the heating. Still further, during the heating, the heating temperature may be increased in stepwise manner, or may be increased at a constant speed.

Consequently, the tubular body 10 is formed on the core body 34 (see, FIG. 3). In addition, by separating the tubular body 10 from the core body 34, the tubular body 10 is produced.

Thickness of the tubular body 10 thus formed may be, for example, in the range of from 30 μm to 150 μm.

The tubular body 10 that is obtained by the manufacturing method of a tubular body according to the exemplary embodiment is appropriately used for, for example, an intermediate transfer belt, a paper conveying belt, or a fixing belt or the like of an electrophotographic image forming device such as a copying machine or a printer.

The volume resistivity of the tubular body 10 that is obtained by the manufacturing method according to the exemplary embodiment is measured according to JIS K6911 as explained above. It is measured by, for example, using the measuring device described below.

Figure 4A:
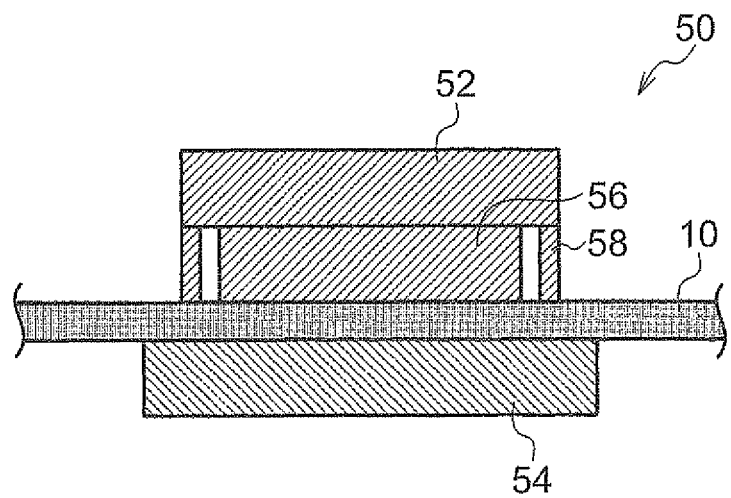
Figure 4B:
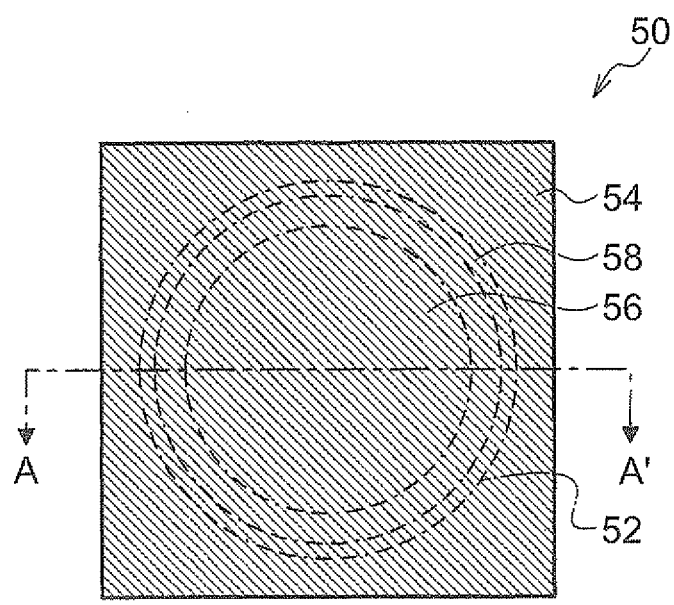

In detail, as shown in FIG. 4A and FIG. 4B, the volume resistivity measuring device 50 is equipped with the circular electrode 52 and the plate type counter electrode 54. The circular electrode 52 has the cylinder type electrode part 56 and the hollow-cylinder type electrode part 58 which has larger inside diameter than the outside diameter of the cylinder type electrode part 56 and wraps around the cylinder type electrode part 56 at a certain distance. The counter electrode 54 is an electrode which is disposed to face the circular electrode 52 via the tubular body 10 of a subject to be measured.

Examples of the circular electrode 52 include UR-100 PROBE of HIRESTA UP (trade name, manufactured by Mitsubishi Analytech Co., Ltd.). Examples of the counter electrode 54 include a plate type electrode made of SUS304. Examples of a device for measuring current include a digital ultra-high resistance/micro-current meter R8340A (trade name; manufactured by Adventest Corporation).

For the measurement of volume resistivity, the tubular body 10 is placed between the cylinder type electrode part 56 of the circular electrode 52 and the counter electrode 54, and a weight (2.0 kg±0.1 kg mass) is applied on the circular electrode 52 so that uniform load may be applied to the tubular body 10. Then, the digital ultra-high resistance/micro-current meter is electrically connected to the circular electrode 52 to have the measurement condition including the charging time of 9 sec, discharging time of 1 sec, and applied voltage of 500 V.

In this case, the volume resistivity of the tubular body 10 of a subject to be measured is ρv, the thickens of the tubular body 10 is t (μm), the value read from R8340A, the digital ultra-high resistance/micro-current meter is R, and the correction coefficient for the volume resistivity of the circular electrode 52 is RCF (V). When UR-100 PROBE of HIRESTA UP (trade name, manufactured by Mitsubishi Analytech Co., Ltd.) is used as the circular electrode 52, RCF (V)=19.635, according to the catalogue of "Resistivity Meter Series" by DIA Instruments (currently Mitsubishi Chemical Analytech Co., Ltd.). Thus, the volume resistivity of the tubular body 10 is calculated according to the following equation (1).

$$\rho v [\Omega \cdot cm] = R \times RCF(V) \times (10000/t) = R \times 19.635 \times (10000/t).$$

For measuring the volume resistivity, the tubular body 10 may be cut along the width direction and spread out to have a plate shape and placed between the circular electrode 52 and the counter electrode 54, and the volume resistivity may be measured by applying voltage between the circular electrode 52 and the counter electrode 54 holding the tubular body 10 having a plate shape between them.

Although the volume resistivity of the tubular body 10 may be measured according to JIS K6911, it is required to have higher voltage applied for the measurement as the volume resistivity of the tubular body 10 becomes higher (for example, the volume resistivity of $1 \times 10^{11}$ Ω·cm or higher). However, the higher the voltage value that is applied between the circular electrode 52 and the counter electrode 54 at the time of measuring the volume resistivity, the easier the adherence phenomenon of the tubular body 10 onto the counter electrode 54 due to residual charge at the time of measurement may occur. As a result, there may be a case in which the measurement result of the volume resistivity of the tubular body 10 is increased significantly compared to an actual value.

The reason for this is thought that, as air is introduced between the counter electrode 54 and the tubular body 10, the area of the tubular body 10 that is introduced with the air is adhered in a circular shape to the counter electrode 54, and as a result the operating area of the cylinder type electrode part 56 in the circular electrode 52 is reduced compared to a case in which no air is introduced.

For the measurement of the volume resistivity, a measuring device for measuring the current is installed on the side of the circular electrode 52. Accordingly, the connecting terminal of the measuring device is electrically connected on the side of the circular electrode 52, and therefore the side of the circular electrode 52 becomes to be in a ground state and allows the voltage to be applied toward the counter electrode 54 via the tubular body 10. Thus, it is thought that, due to the charges accumulated inside the tubular body 10, adherence of the tubular body 10 on the side of the counter electrode 54 may occur.

Figure 5A:
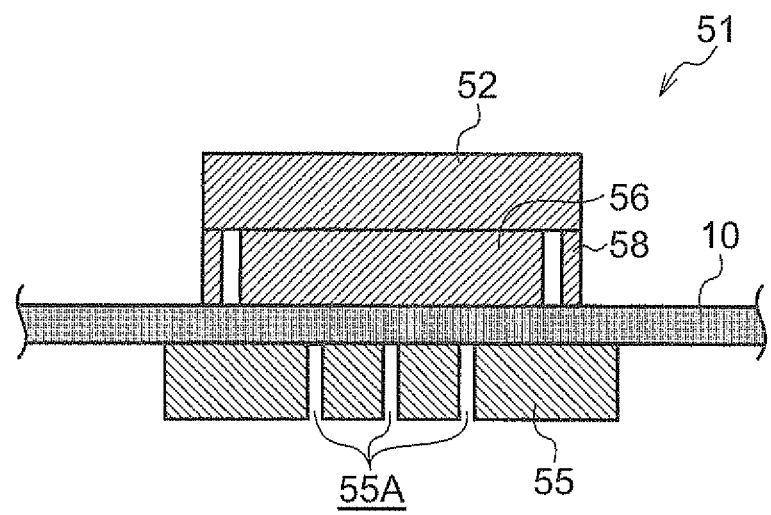
Figure 5B:
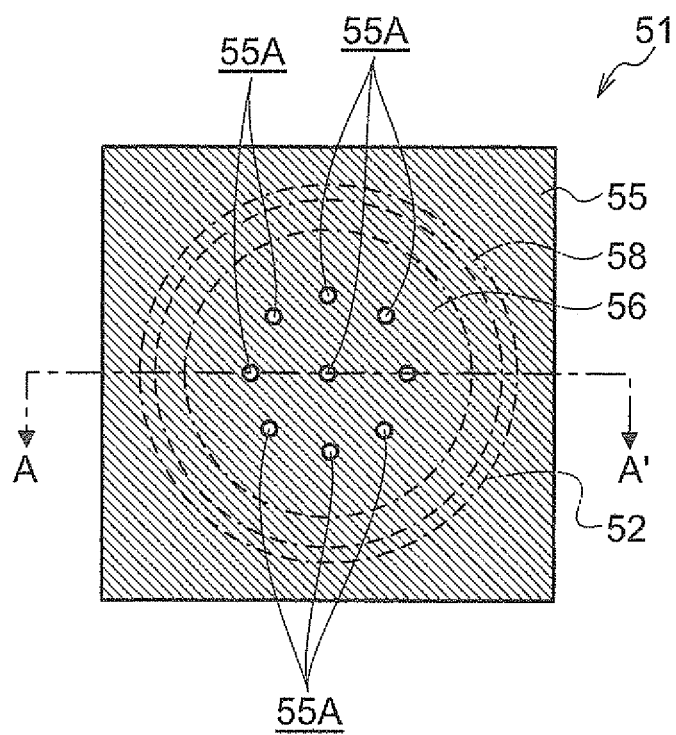

For such reasons, as the counter electrode 54 in a measuring device to measure the volume resistivity of the tubular body 10, it is preferable to use a counter electrode having a via hole penetrating the counter electrode 54 in the thickness direction in a region which faces the cylinder type electrode part 56 at the time of the measurement of the volume resistivity (see, the counter electrode 55 in FIG. 5A and FIG. 5B). Alternatively, as the counter electrode 54 in a measuring device to measure the volume resistivity of the tubular body 10, it is preferable to use a counter electrode having concave parts in a region which faces the cylinder type electrode part 56 at the time of measuring the volume resistivity at the surface of the counter electrode 54 facing the cylinder type electrode part 56, wherein the concave parts extend from inside the region to outside the region (see, the counter electrode 59 in FIG. 6A and FIG. 6B).

It is thought that, by using the electrode having the constitution described above as the counter electrode 54, introduction of an air between the counter electrode 54 and the tubular body 10 may be suppressed at the time of measuring the volume resistivity, and as a result more precise measurement of the volume resistivity of the tubular body 10 may be enabled.

Figure 6A:
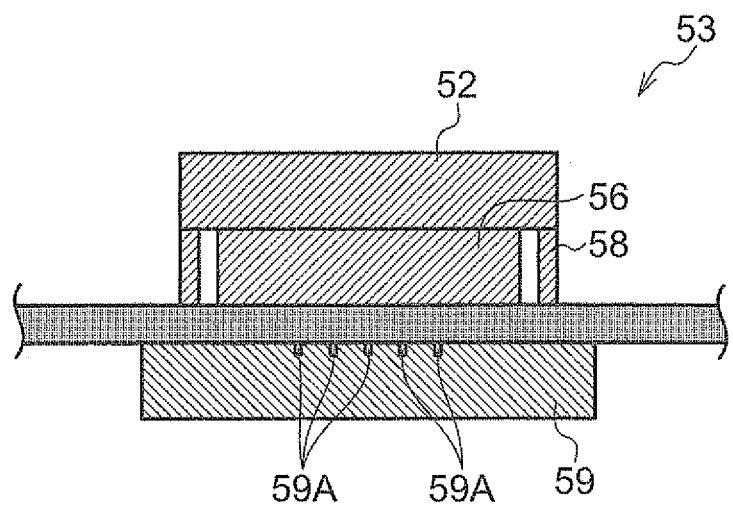
Figure 6B:
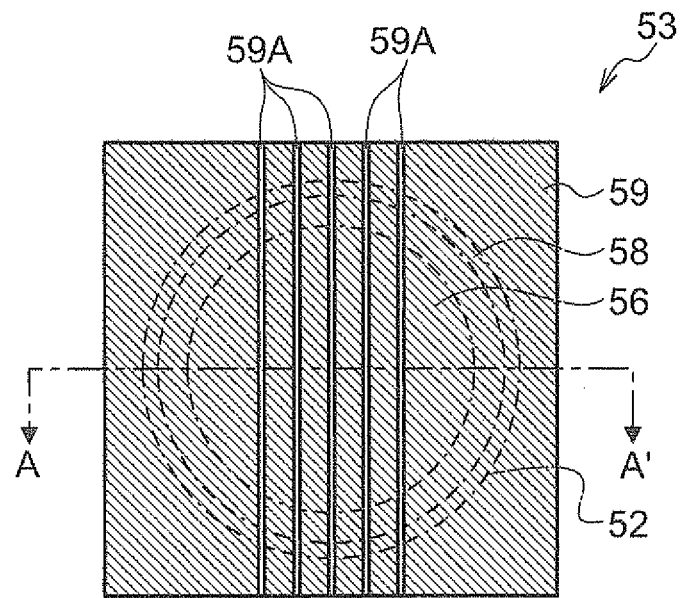

In detail, it is preferable to use the volume resistivity measuring device 51 shown in FIG. 5A and FIG. 5B or the volume resistivity measuring device 53 shown in FIG. 6A and FIG. 6B.

The volume resistivity measuring device 51 shown in FIG. 5A and FIG. 5B is equipped with the circular electrode 52 and the plate type counter electrode 55. Similar to the volume resistivity measuring device 50 shown in FIG. 4A and FIG. 4B, the circular electrode 52 is equipped with the cylinder type electrode part 56 and the hollow-cylinder type electrode part 58. The counter electrode 55 is an electrode which is disposed to face the circular electrode 52 via the tubular body 10 of a subject to be measured at the time of measuring volume resistivity.

The counter electrode 55 has a large plate shape so that the surface area facing the circular electrode 52 is larger than the cylinder type electrode part 56 when it is disposed to face the circular electrode 52 via the tubular body 10 of a subject to be measured. As shown in FIG. 5A and FIG. 5B, in the counter electrode 55 one or plural via holes 55A, which penetrates the counter electrode 55 in the thickness direction, are formed in a region which faces the cylinder type electrode part 56 at the time of the measurement of the volume resistivity at the counter electrode 55.

At least one via hole 55A may be formed in a region which faces the cylinder type electrode part 56 at the time of the measurement of the volume resistivity at the counter electrode 55. It may have plural holes formed therein. When plural via holes 55A are formed in the counter electrode 55, it is preferable that each distance between via holes 55A is the same to one another.

The cross-section area of each via hole 55A is preferably adjusted to be 1/100 or less of the surface area of the region which faces the cylinder type electrode part 56 at the time of the measurement of the volume resistivity at the counter electrode 55. When plural via holes 55A are formed in the counter electrode 55, the total of the cross-section area (i.e., total cross-section area) of via holes 55A formed in the counter electrode 55 is preferably adjusted to be 1/20 or less of the surface area of the region which faces the cylinder type electrode part 56 at the time of the measurement of the volume resistivity at the counter electrode 55.

The number of the via hole 55A may be one or more, and it may be adjusted so that the cross-section area of each via hole 55A and the total cross-section area of plural via holes 55A satisfy the condition described above.

Specifically, the counter electrode 55 may be constituted to have one via hole that is present at a position corresponding to the center of the circle of the cylinder type electrode part 56 and six via holes that are present with an interval of 60° on the circumference with diameter 10 mm wherein the center of the circle with diameter of 10 mm is also at a position corresponding to the center of the circle of the cylinder type electrode part 56, i.e., seven via holes 55A (inside diameter of 0.5 mm) in total are formed in a region which faces the cylinder type electrode part 56 at the time of the measurement of the volume resistivity at the counter electrode 55 (see FIG. 5B).

Meanwhile, the volume resistivity measuring device 53 shown in FIG. 6A and FIG. 6B is equipped with the circular electrode 52 and the plate type counter electrode 59. Similar to the volume resistivity measuring device 50 shown in FIG. 4A and FIG. 4B, the circular electrode 52 is equipped with the cylinder type electrode part 56 and the hollow-cylinder type electrode part 58. The counter electrode 59 is an electrode which is disposed to face the circular electrode 52 via the tubular body 10 of a subject to be measured at the time of measuring volume resistivity.

The counter electrode 59 has a large plate shape so that the surface area facing the circular electrode 52 is larger than the cylinder type electrode part 56 when it is disposed to face the circular electrode 52 via the tubular body 10 of a subject to be measured. As shown in FIG. 6A and FIG. 6B, in the counter electrode 59 one or plural concave parts 59A are formed on a surface which faces the cylinder type electrode part 56 at the time of measuring the volume resistivity at the counter electrode 59, wherein the concave parts extend from the region facing the cylinder type electrode part 56 at the time of measuring volume resistivity to outside the region. When plural concave parts 59A are formed in the counter electrode 59, each distance between concave parts 59A is preferably the same.

The length of each concave part 59A along the width direction (i.e., the length in the direction perpendicular to the length direction) is preferably adjusted so that the surface area of one concave part 59A in the region facing the cylinder type electrode part 56 at the time of measuring the volume resistivity at the counter electrode 59 is 1/100 or less of the total surface area of the region facing the cylinder type electrode part 56 at the time of measuring the volume resistivity.

The number of the concave part 59A is preferably adjusted according to the length along the width direction of the concave part 59A so that the total surface area of the concave parts 59A in the region facing the cylinder type electrode part 56 at the time of measuring the volume resistivity is 1/20 or less of the total surface area of the region facing the cylinder type electrode part 56 at the time of measuring the volume resistivity.

Specifically, the counter electrode 59 may have, for example, five elangated concave parts 59A having a width of 0.2 mm that are formed with an interval of 5 mm and extend from the outside of the region facing the cylinder type electrode part 56 at the time of measuring volume resistivity, at the counter electrode 59, crossing the region, and reaching the outside of the region (see, FIG. 6B).

EXAMPLES

Herein below, the invention is explained in further detail below by reference to examples. However, the invention is not limited to these examples. The term "parts" in the examples means the "parts by weight."

Example 1

The tubular body 1 is manufactured by performing the following processes.

First, as a polyimide precursor solution, the polyimide precursor solution containing 3,3',4,4'-biphenyl tetracarboxylic acid dianhydride and 4,4'-diaminodiphenyl ether (trade name: U IMIDE, manufactured by Unitika, Ltd., solid matter concentration of 18%, N-methyl pyrrolidone as a solvent, and viscosity of 50 Pa·s at 25° C.) is prepared.

Then, as a conductive agent having an acidic group, carbon black (trade name: SPECIAL BLACK 4, manufactured by Degussa Mils) is mixed in 20% weight ratio of the solid matter with the polyimide precursor solution. Then, the mixture is dispersed by using a counter collision type disperser (trade name: GEANUS PY, manufactured by Geanus). At the time of dispersion, the solution temperature is maintained at 50° C. by controlling the temperature of cooling water. By repeating the collision operation 5 times, dispersion is carried out. As a result, a heat-curable solution having the viscosity of 4 Pa·s at 50° C. and the viscosity of 20 Pa·s at 25° C. is prepared.

Then, as a heat-curable solution used for coating, both solutions obtained by maintaining thus produced heat-curable solution for 3 days at 15° C. and for 20 days at 15° C., respectively, during the period from the dispersion to coating on the core body 34 (i.e., period from the completion of the dispersion to the coating on a core body), is prepared.

Separately, a SUS304 hollow-cylinder type member (outer diameter of 366 mm, thickness of 6 mm, and length of 900 mm) is prepared, and its surface is roughened to Ra of 0.4 µm by blast treatment using spherical alumina particles. As a plate for holding the hollow-cylinder type member, a disc which has a thickness of 8 mm, an outer diameter allowing its insertion into the opening of the hollow-cylinder type member, and four air holes with the diameter of 100 mm formed therein is produced with the same SUS material. The disc is inserted into the opening of the hollow-cylinder type member (i.e., both end surfaces in the width direction) and welded thereto. On the surface of the hollow-cylinder type member, a silicone-based release agent (trade name: SEPA-COAT, manufactured by Shin-Etsu Chemical Co., Ltd.) is coated, and baking treatment for 1 hour at 300° C. is carried out. As a result, the core body 34 is produced.

Next, by using the film forming device 40 shown in FIG. 1, the heat-curable solution is coated on the core body 34 produced above. In addition, the heat-curable solution produced in this example is added to the reservoir 20 of a film forming device shown in FIG. 1, and maintained for 3 days at 15° C. by the temperature control device 32 (maintaining process).

In the film forming device 40, the pump 24 is connected to the reservoir 20 in which the heat-curable solution prepared in this example is contained (see, the heat-curable solution 20A in FIG. 1), and 20 ml of the solution is ejected per minute from the nozzle 26. From the position which is 40 mm apart from one end of the core body 34 produced above to the position which is 40 mm apart from the other end, the ejection is performed (coating film forming process). As described above, as the heat-curable solution 20A, the heat-curable solution maintained for 3 days at 15° C. during the period from the completion of the dispersion to the coating on the core body 34 (i.e., period from the completion of the dispersion to the coating on a core body) is used. As the blade 29, a stainless plate having thickness of 0.2 mm is processed to have the width of 20 mm and the length of 50 mm is used.

After the heat-curable solution 20A ejected is adhered to the core body 34 while rotating the core body 34 at 60 rpm in the rotation direction A, the blade 29 is placed to touch the surface and is moved at the speed of 210 min/minute in the axial direction of the core body 34 (see, arrow B in FIG. 1). As a result, the spiral streak on the surface of the coating film 10 are disappeared. At the end of the coating film 10A, the blade 29 is moved backward by 50 mm so that it is no longer in direct touch with the surface of the core body 34. As a result, the coating film 10A having the film thickness of 500 µm is formed (coating film forming process). This thickness corresponds to the thickness of 80 µm of the tubular body 10 obtained after undergoing the heat-curing process described below. Then, the core body 34 is placed to a drying device at 170° C. while being rotated at 10 rpm, and dried for 20 minutes. Consequently, the amount of the residual solvent becomes 40% by weight, and thus the coating film 10A which does not sag even when the rotation of the core body 34 is stopped and the core body 34 is stood up along the length direction, is obtained. Then, the core body 34 is removed from the rotation board, and in a perpendicular direction (i.e., rotation axis direction is the perpendicular direction), placed in a heating furnace and heated at 200° C. for 30 minutes and 300° C. for 30 minutes to perform simultaneously the drying of residual solvent and the imidation (heat-curing process). After cooling to room temperature, the heat-cured coating film 10A (tubular body 10) is separated from the core body 34. In addition, the center of the heat-cured coating film 10A (tubular body 10) separated is cut, and unnecessary part is removed from both ends to obtain two tubular body 10 having the width of 360 mm. The thickness of the tubular body 10 measured by using a dial gauge is 80 p.m.

The tubular body 10 is produced with the same condition and materials as above except that the solution is maintained for 20 days at 15° C. during the period from the completion of the dispersion to the coating on the core body 34 (i.e., period from the completion of the dispersion to the coating on a core body).

Example 2

In Example 1, two kinds of tubular body 10 are produced by maintaining the heat-curable solution 20A prepared in Example 1 for 3 days at 15° C. or for 20 days at 15° C. during the period from the completion of the dispersion to the coating on the core body 34 (i.e., period from the completion of the dispersion to the coating on a core body).

In this Example, two kinds of the tubular body 10 (one maintained for 3 days at 10° C. and the other maintained for 20 days at 10° C.) are produced with the same condition and materials as in Example 1 except that temperature of the heat-curable solution 20A is 10° C. during the period from the completion of the dispersion to the coating on the core body 34 (i.e., period from the completion of the dispersion to the coating on a core body).

Example 3

In Example 1, the temperature for dispersing the heat-curable solution 20A prepared in Example 1 is 50° C. In this example, two kinds of the tubular body 10 (one maintained for 3 days at 15° C. and the other maintained for 20 days at 15° C.) are produced with the same condition and materials as in Example 1 except that the dispersion temperature (the temperature for dispersing the heat-curable solution 20A) is changed to 70° C.

Example 4

In Example 1, as a conductive agent having an acidic group, carbon black (trade name: SPECIAL BLACK 4) is mixed in 20% weight ratio of the solid matter with the polyimide precursor solution, and then the mixture is dispersed by using a counter collision type disperser (trade name: GEANUS PY, manufactured by Geanus Co.). In this example, two kinds of the tubular body 10 (one maintained for 3 days at 15° C. and the other maintained for 20 days at 15° C.) are produced with the same condition and materials as in Example 1 except that the weight ratio of the solid matter of the conductive agent is changed to 30%.

Example 5

In Example 1, as a conductive agent having an acidic group, carbon black (trade name: SPECIAL BLACK 4) is mixed in 20% weight ratio of the solid matter with the polyimide precursor solution, and then the mixture is dispersed by using a counter collision type disperser (trade name: GEANUS PY, manufactured by Geanus Co.). In this example, two kinds of the tubular body 10 (one maintained for 3 days at 15° C. and the other maintained for 20 days at 15° C.) are produced with the same condition and materials as in Example 1 except that the weight ratio of the solid matter of the conductive agent is changed to 18%.

Comparative Example 1

In Example 1, two kinds of tubular body 10 are produced by maintaining the heat-curable solution 20A prepared in Example 1 for 3 days at 15° C. and for 20 days at 15° C., respectively, during the period from the completion of the dispersion to the coating on the core body 34 (i.e., period from the completion of the dispersion to the coating on a core body).

In this Comparative example, two kinds of the tubular body 10 (one maintained for 3 days at 20° C. and the other maintained for 20 days at 20° C.) are produced with the same condition and materials as in Example 1 except that the temperature of the heat-curable solution 20A is 20° C. during the period from the completion of the dispersion to the coating on the core body 34 (i.e., period from the completion of the dispersion to the coating on a core body).

Comparative Example 2

In Example 1, two kinds of tubular body 10 are produced by maintaining the heat-curable solution 20A prepared in Example 1 for 3 days at 15° C. and for 20 days at 15° C., respectively, during the period from the completion of the dispersion to the coating on the core body 34 (i.e., period from the completion of the dispersion to the coating on a core body).

In this Comparative example, two kinds of the tubular body 10 (one maintained for 3 days at 17° C. and the other maintained for 20 days at 17° C.) are produced with the same condition and materials as in Example 1 except that the temperature of the heat-curable solution 20A is 17° C. during the period from the completion of the dispersion to the coating on the core body 34 (i.e., period from the completion of the dispersion to the coating on a core body).

<Evaluation of Variation in Volume Resistivity Depending on Difference in Maintaining Time of Heat-Curable Solution>

With regard to the tubular bodies produced in Example and Comparative example above, according to the measurement method described below, the volume resistivity is measured for the tubular body which is produced by maintaining the heat-curable solution for 3 days and the tubular body which is produced by maintaining the heat-curable solution for 20 days. The measurement results are shown in Table 1. In addition, by obtaining a difference in common logarithmic values of the volume resistivity, variation in volume resistivity is evaluated. The evaluation results are shown in Table 1.

Evaluation criteria are as follows.

—Evaluation of variation in volume resistivity—

G1: the difference in common logarithmic values of volume resistivities of the tubular bodies, which are produced by maintaining the heat-curable solution for 3 days and 20 days, respectively, is less than 0.1.

G2: the difference in common logarithmic values of volume resistivities of the tubular bodies, which are produced by maintaining the heat-curable solution for 3 days and 20 days, respectively, is from 0.1 to 0.3.

G1: the difference in common logarithmic values of volume resistivities of the tubular bodies, which are produced by maintaining the heat-curable solution for 3 days and 20 days, respectively, is more than 0.3.

The volume resistivity of the tubular body is measured according to the following measurement method.

(Measurement of Volume Resistivity)

For the measurement of volume resistivity of the tubular body, the volume resistivity measuring device 51, as shown in FIG. 5A and FIG. 5B, is used. As the circular electrode 52, the volume resistivity measuring device 51 employs UR-100 PROBE (manufactured by Mitsubishi Analytech Co., Ltd.) having a structure of double-ring electrode as explained in the above. As the counter electrode 55, a stainless (SUS304) plate-like member having thickness of 5 mm (80 mm×500 mm) is used. In the counter electrode 55, one via hole is present at the center of a region which faces the circular electrode 52 at the time of the measurement of the volume resistivity at the counter electrode 55 (i.e., a position corresponding to the center of the circle of the circular electrode 52) and six via holes are present with an interval of 60° on the circumference with a diameter of 10 mm wherein the center of the circle with a diameter of 10 mm is also present at a position corresponding to the center of the circle of the circular electrode 52, i.e., seven via holes 55A (inside diameter of 0.5 mm) in total are formed (see, FIG. 5A and FIG. 5B). Accordingly, by using the counter electrode 55 having the via hole 55A formed therein, introduction of air between the counter electrode 55 and the tubular body 10 of a subject to be measured is suppressed, and therefore volume resistivity is measured more accurately.

The measurement of volume resistivity of the tubular body 10 using the volume resistivity measuring device 51 is carried out according to JIS K6911 (1995). Specifically, the tubular body 10 cut open along the width direction to obtain plate-like body, and the resulting plate-like body is placed on the counter electrode 55. Then, further, on the resultant plate-like body, the circular electrode 52 is placed so that the cylinder type electrode part 56 side of the circular electrode 52 is in contact with the tubular body 10. Thereafter, a weight of 2.0 kg±0.1 kg (19.6 N±1.0 N) is placed on the circular electrode 52 so that uniform load may be applied to the tubular body 10 of a subject to be measured.

A digital ultra-high resistance/micro-current meter (manufactured by Adventest Corporation, trade name: R8340A) is electrically connected to the circular electrode 52. The measurement condition includes the charging time of 30 sec, discharging time of 1 sec, and applied voltage of 500 V.

In this case, the volume resistivity of the tubular body 10 of a subject to be measured is $\rho v$, the thickens of the tubular body 10 is t (μm), the value read from R8340A, the digital ultra-high resistance/micro-current meter is R, and the correction coefficient for the volume resistivity of the circular electrode 52 is RCF (V). When UR-100 PROBE of HIRESTA UP (trade name, manufactured by Mitsubishi Analytech Co., Ltd.) is used as the circular electrode 52, RCF (V)=19.635 according to the catalogue of "Resistivity Meter Series" by DIA Instruments (currently Mitsubishi Chemical Analytech Co., Ltd.). Thus, the volume resistivity of the tubular body 10 is calculated according to the following equation (1).

$$\rho v [\Omega \cdot cm] = R \times RCF(V) \times (10000/t) = R \times 19.635 \times (10000/t). \qquad \text{Equation (1)}$$

According to the measurement method described above, for both tubular bodies that are produced in Example and Comparative example, by maintaining the heat-curable solution for 3 days and 20 days, respectively, each volume resistivity is measured by applying voltage of 500 V under the condition of 22° C. and 55% RH. The measurement results are shown in Table 1, and the difference in the common logarithmic values of the volume resistivities (log $\Omega/\square$) is also shown Table 1.

TABLE 1

| | Heat-curable solution | | Maintained for 3 days in the maintaining process | | Maintained for 20 days in the maintaining process | | | |
|---|---|---|---|---|---|---|---|---|
| | Temperature in the dispersion process | Temperature in the maintaining process | Volume resistivity [Ωcm] | Common logarithmic value of the volume resistivity [LogΩcm] | Volume resistivity [Ωcm] | Common logarithmic value of the volume resistivity [LogΩcm] | \|A − B\| | Evaluation of variation in volume resistivity |
| Example 1 | 50° C. | 15° C. | $2.1 \times 10^{12}$ | 12.33 | $2.5 \times 10^{12}$ | 12.40 | 0.07 | G1 |
| Example 2 | 50° C. | 10° C. | $1.6 \times 10^{12}$ | 12.20 | $1.7 \times 10^{12}$ | 12.22 | 0.02 | G1 |
| Example 3 | 70° C. | 15° C. | $3.2 \times 10^{12}$ | 12.50 | $3.7 \times 10^{12}$ | 12.57 | 0.07 | G1 |
| Example 4 | 50° C. | 15° C. | $1.8 \times 10^{8}$ | 8.25 | $1.6 \times 10^{8}$ | 8.20 | 0.05 | G1 |
| Example 5 | 50° C. | 15° C. | $3.2 \times 10^{13}$ | 13.50 | $6.2 \times 10^{13}$ | 13.79 | 0.29 | G2 |
| Comparative example 1 | 50° C. | 20° C. | $2.5 \times 10^{12}$ | 12.40 | $1.7 \times 10^{13}$ | 13.22 | 0.82 | G3 |
| Comparative example 2 | 50° C. | 17° C. | $2.1 \times 10^{12}$ | 12.33 | $7.9 \times 10^{12}$ | 12.90 | 0.57 | G3 |

As described in Table 1, in the tubular body produced in the Example 1, the variation in volume resistivity depending on the difference in a maintaining time of the heat-curable solution is suppressed compared to the tubular body produced in the Comparative example.

The foregoing description of the exemplary embodiments of the present invention has been provided for the purposes of illustration and description. It is not intended to be exhaustive or to limit the present invention to the precise forms disclosed. Obviously, many modifications and variations will be apparent to practitioners skilled in the art. The exemplary embodiments are chosen and described in order to best explain the principles of the present invention and its practical applications, thereby enabling others skilled in the art to understand the present invention for various exemplary embodiments and with the various modifications as are suited to the particular use contemplated.

What is claimed is:

1. A method for manufacturing a tubular body, the method comprising:

maintaining at about 15° C. or lower a heat-curable solution consisting essentially of a polyimide precursor solution in which a conductive agent having an acidic group is dispersed;

coating the heat-curable solution maintained at about 15° C. or lower on a core body while the core body is rotated to form a coating film of the heat-curable solution; and curing the coating film by heating and separating the cured coating film from the core body, to obtain a tubular body.

2. The method for manufacturing a tubular body according to claim 1, wherein a volume resistivity of the tubular body is about $1\times10^{11}\Omega\cdot$ cm or higher.

3. The method for manufacturing a tubular body according to claim 1, wherein the core body comprises a tubular core body.

* * * * *